(12) United States Patent
Lane et al.

(10) Patent No.: US 6,758,437 B1
(45) Date of Patent: Jul. 6, 2004

(54) ROCKET ENGINE NACELLE

(75) Inventors: Jeffery G. Lane, Irvine, CA (US);
Richard B. Magarro, Kent, WA (US)

(73) Assignee: McDonnell Douglas Corporation, St. Louis, MO (US)

( * ) Notice: Subject to any disclaimer, the term of this patent is extended or adjusted under 35 U.S.C. 154(b) by 1826 days.

(21) Appl. No.: 08/796,189

(22) Filed: Feb. 7, 1997

(51) Int. Cl.$^7$ .................................................. B64B 1/36
(52) U.S. Cl. .................. 244/52; 244/3.22; 239/265.35; 60/232; 60/271
(58) Field of Search .................. 239/265.19, 265.23, 239/265.33, 265.35, 127.1; 60/228, 230, 232, 229, 257, 271, 267; 244/52, 3.22, 73 R; 102/374

(56) References Cited

U.S. PATENT DOCUMENTS

| | | | | |
|---|---|---|---|---|
| 3,140,583 A | * | 7/1964 | Hopper | 244/3.22 |
| 3,147,591 A | * | 9/1964 | McEwen | 239/265.35 |
| 3,285,520 A | * | 11/1966 | Johnson | 239/265.35 |
| 3,339,864 A | * | 9/1967 | Whitson | 244/169 |
| 3,358,932 A | * | 12/1967 | Wilhite | 239/265.35 |
| 3,768,254 A | * | 10/1973 | Stuart | 60/257 |
| 4,116,405 A | * | 9/1978 | Bacchi et al. | 244/56 |
| 4,432,512 A | * | 2/1984 | Young | 239/265.19 |
| 4,579,299 A | * | 4/1986 | Lavery et al. | 244/3.22 |
| 4,763,857 A | * | 8/1988 | Booth et al. | 244/3.22 |
| 4,826,104 A | * | 5/1989 | Bennett et al. | 239/265.19 |
| 4,913,379 A | * | 4/1990 | Kubota et al. | 60/230 |
| 4,955,559 A | * | 9/1990 | Kaminskas | 244/169 |
| 5,048,289 A | * | 9/1991 | Brown | 60/267 |
| 5,456,429 A | * | 10/1995 | Mayersak | 244/169 |

* cited by examiner

Primary Examiner—J. Woodrow Eldred
(74) Attorney, Agent, or Firm—Alston & Bird LLP

(57) ABSTRACT

A nacelle comprised of a rigid shroud and a support truss. The shroud encloses the truss and a rocket engine. The shroud is comprised of three sections, including a top section and two side sections. The top section has openings to permit the communication of lines for liquid propellant, electrical current, and hydraulic fluid between the engine and an attached flight vehicle. The two side sections are connected to each other by longitudinal field joints, and to the top section by a circumferential field joint. The rocket engine is attached to the flight vehicle by a gimbal allowing the engine to rotate relative to the flight vehicle about orthogonal pitch and yaw axes. A pair of actuators is located in the flight vehicle, one to control the rotation of the rocket engine about the pitch axis, and the other to control its rotation about the yaw axis. The truss is attached to the body of the rocket engine. The two actuators are respectively connected to the shroud at a pair of hard points where the shroud is attached to the truss. The shroud is also fastened to the rocket engine around the circumference of the nozzle's exhaust orifice, and around an attachment cone located adjacent to the gimbal. The actuator forces are transmitted to the rocket engine primarily through the truss. Since the shroud is attached to the rocket engine, the shroud rotates with the rocket engine relative to the flight vehicle.

24 Claims, 5 Drawing Sheets

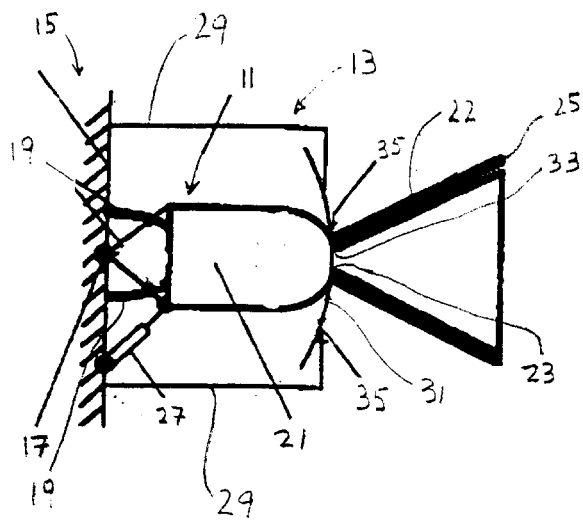

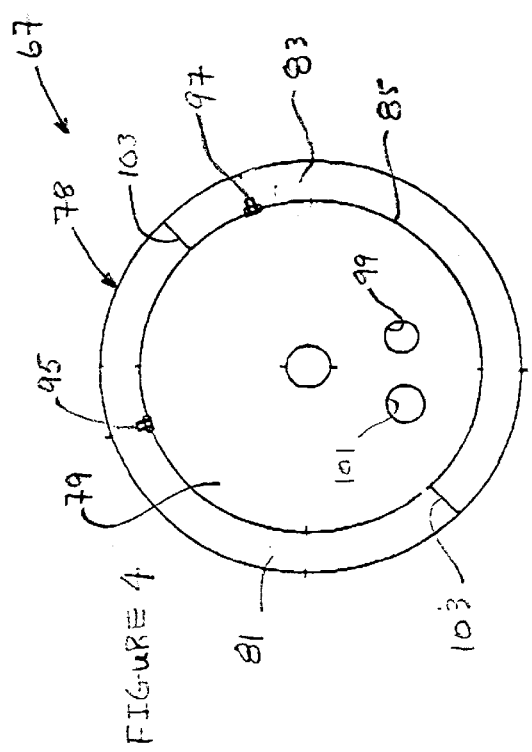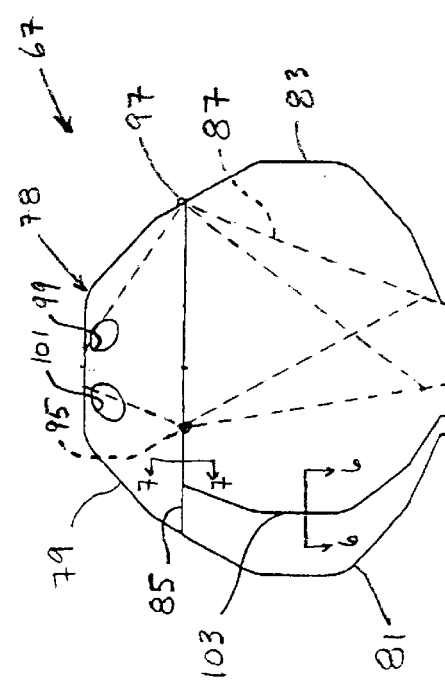

ROCKET ENGINE NACELLE

BACKGROUND OF THE INVENTION

The present invention relates generally to a nacelle for protecting a reusable rocket engine from the effects of its exhaust plume and, more particularly, to a nacelle which includes a rigid shroud enclosing and rotating with the rocket engine when the engine is rotated to vector its thrust.

The exhaust plume emanating from the nozzle of a reusable liquid propellant rocket engine creates a severe thermal and acoustic environment adjacent to the engine. More particularly, the temperature adjacent the nozzle's exhaust orifice may exceed two thousand degrees Fahrenheit (2,000° F.). At high altitudes, the exhaust plume expands laterally beyond the circumference of the nozzle's exhaust orifice. Thus, especially at high altitudes, the lateral sides of the engine, if left unprotected, would be exposed to an extremely high heat transfer rate due to convection and radiation from the expanded exhaust plume. Many of the essential components of a liquid propellant rocket engine, in particular, the lines communicating the liquid propellant, hydraulic fluid, and electrical current, could not withstand such a high heat transfer rate.

The exhaust gases expand downstream of the choke plane of the nozzle. A lattice of standing shock waves is created in the exhaust plume when those gases expand and accelerate to reach supersonic velocity. High amplitude acoustic waves are generated by the shock waves in the plume. When the flight vehicle is in subsonic flight, these acoustic waves travel upstream from the plume. If the rocket engine was left unprotected, these waves would impinge on the engine's sides. Due to the proximity of the rocket engine to the exhaust plume, the strength of these acoustic waves would be only minimally diminished upon impingement. Repeated exposure to such high intensity acoustic waves would cause fatigue in the operating parts and structure of the rocket engine, and deleteriously affect its reliability and structural integrity.

Furthermore, in a vertical launch the exhaust plume causes debris on the ground to be blown upwards. Absent a protective barrier, this debris could impinge on the sides of the rocket engine. This problem would also be present should a liquid propellant rocket engine be used on a flight vehicle designed to land vertically, that is, with the thrust vector oriented perpendicularly to the ground, as opposed to a conventional horizontal landing.

Designers of reusable rocket engines have used rigid covers to insulate the engines from the heat and acoustic waves generated by the exhaust plume, as well as to protect them from impinging debris blown upwards from the ground during launch. Since modern rocket engines rotate about at least one axis in order to vector thrust, the cover must allow for such rotation. In addition, since the rocket engine is reusable, the cover must provide for easy access to facilitate inspection, maintenance and repair of the engine.

As illustrated in FIG. 1, one approach has been to enclose rocket engine 11 with rigid cover 13, and to attach cover 13 to flight vehicle 15. In particular, rocket engine 11 includes gimbal 17, propellant lines 19 communicating with powerhead 21, exhaust nozzle 22, and nozzle throat 23. Nozzle 22 includes insulation 25 to protect its exterior sides from the acoustic waves and heat that will emanate from an expanded exhaust plume.

Gimbal 17 is attached to flight vehicle 15 and allows rocket engine 11 to rotate relative to flight vehicle 15 about pitch and yaw axes. Pitch actuator 27 is connected to engine 11 and rotates it about the pitch axis to vector its thrust. A second actuator for controlling yaw rotation is not shown. Powerhead 21 contains electrical, hydraulic, and liquid propellant lines.

Cover 13 is fixedly attached to flight vehicle 15 and is comprised of shroud 29 and eyeball shield 31. Eyeball shield 31 includes annular opening 33, which circumscribes nozzle throat 23. Flexible annular seal 35 provides an airtight interface between shroud 29 and eyeball shield 31. Eyeball shield 31 rotates with rocket engine 11 as the engine is rotated about gimbal 17 by pitch actuator 27 and the yaw actuator. Eyeball shield 31 thus rotates relative to flight vehicle 15 and shroud 29, along with rocket engine 11.

A second approach is shown in FIG. 2. Rocket engine 37 includes gimbal 39, propellant lines 41 communicating with powerhead 43, exhaust nozzle 45, and nozzle exhaust orifice 47. Gimbal 39 is attached to flight vehicle 49 about pitch and yaw axes. Actuator 51 is connected to rocket engine 37 and rotates it about the pitch axis to vector its thrust. A second actuator for controlling rotation about the yaw axis is not shown.

Cover 53 is rigidly attached to flight vehicle 49 and is comprised of shroud 55 and eyeball shield 57. Eyeball shield 57 includes annular opening 59. In this case however, opening 59 circumscribes exhaust orifice 47 rather than the nozzle throat. Annular seal 61 provides an airtight interface between shroud 55 and eyeball shield 57. Eyeball shield 57 thus rotates relative to vehicle 49 and shroud 55, along with rocket engine 37.

Annular seals 35 and 61 are comprised of a complex spring mechanism which presses a flexible material against the opposing surfaces of the shroud and the sliding eyeball shield. Due to their mechanical complexity and the effect of harsh operating conditions, the annular seals used in the engine covers of the prior art are expensive, unreliable, and require continual inspection, adjustment, and maintenance.

Furthermore, inspecting and performing repairs or routine maintenance on the rocket engine requires removing and reinstalling the annular seal of the prior art because the eyeball shield remains attached to the nozzle when the shroud is removed. Referring to rocket engine 37 in FIG. 2, eyeball shield 57 remains attached to exhaust orifice 47 when shroud 55 is removed from flight vehicle 49. Removing shroud 55 pursuant to performing routine maintenance on engine 37 thus entails detaching shroud 55 from flight vehicle 49 and removing seal 61. Reinstallation of shroud 55 requires reinstallation of seal 61, which is a tedious, laborious and time consuming task.

Based on the foregoing, it can be appreciated that there presently exists a need in the art for a nacelle for a reusable rocket engine which overcomes the above-described disadvantages and shortcomings of the prior art. The present invention fulfills this need in the art.

SUMMARY OF THE INVENTION

Briefly, the present invention encompasses a nacelle for enclosing a reusable liquid propellant rocket engine. The nacelle is comprised of a rigid shroud and a support truss. The shroud encloses the truss and the rocket engine. The shroud is comprised of three sections, including a top section and two side sections. The top section has openings to permit the communication of lines for liquid propellant, electrical current, and hydraulic fluid between the flight vehicle and the engine. The two side sections are connected to each other by longitudinal field joints, and to the top section by a circumferential field joint.

The rocket engine is attached to the flight vehicle by a gimbal allowing the engine to rotate relative to the flight vehicle about pitch and yaw axes. A pair of actuators is located in the flight vehicle. One of the actuators controls the rotation of the engine about the pitch axis, while the other controls the rotation about the yaw axis. Each actuator is connected to the shroud at a hard point where the shroud is attached to the truss.

The shroud is also fastened to the rocket engine around the nozzle's exhaust orifice, and around an attachment cone located adjacent to the gimbal. The foregoing attachment configuration transmits almost all of the forces applied by the actuators through the truss to the engine. The shroud transmits very little of the actuator forces. Since the shroud is attached to the rocket engine, the shroud rotates with the engine.

The nacelle of the present invention insulates the propellant, hydraulic and electrical lines of an enclosed rocket engine from the severe thermal and acoustic environment occasioned by the exhaust plume, as well as protects them from ground debris blown upwards during launch and, possibly, landing. It achieves the foregoing without using the complex spring-loaded seals of the prior art. The nacelle is thus able to realize improved reliability, savings in cost, and reduced maintenance over the engine covers of the prior art. Furthermore, removal and installation of the nacelle takes substantially less time and labor compared to the prior art covers. This significantly facilitates inspecting, maintaining and repairing the reusable rocket engine.

BRIEF DESCRIPTION OF THE DRAWINGS

These and various other features and aspects of the present invention will be readily understood with reference to the following detailed description read in conjunction with the accompanying drawings, in which:

FIG. 1 is a schematic drawing which depicts a side view of a prior art cover for a liquid propellant rocket engine;

FIG. 2 is a schematic drawing which depicts a side view of a second prior art cover for a liquid propellant rocket engine;

FIG. 3 is a schematic drawing which depicts a partially cross-sectioned side view of a rocket engine enclosed by the nacelle of the present invention;

FIG. 4 is a top view of the shroud of the nacelle;

FIG. 5 is a side view of the shroud of the nacelle;

DETAILED DESCRIPTION OF THE INVENTION

Figure 6:
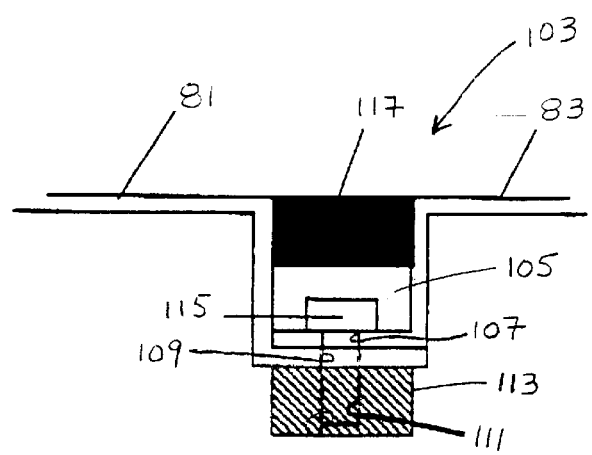
FIG. 6 is a cross-sectional side view of the field joint used to attach the two side sections of the shroud together.

FIG. 3 is a schematic drawing which depicts liquid propellant rocket engine 65 enclosed by nacelle 67, which constitutes a preferred embodiment of the present invention. A cross-sectional side view of nacelle 67 is shown, whereas the side view of engine 65 is not sectioned. Rocket engine 65 includes liquid propellant lines 68, powerhead 69, exhaust nozzle 71, and exhaust orifice 73. Gimbal 75 attached engine 65 to flight vehicle 77, and allows engine 65 to rotate about pitch and yaw axes relative to the flight vehicle 77.

Nacelle 67 includes rigid shroud 78, which is in turn comprised of top section 79 and side sections 81 and 83. Circumferential field joint 85 joins top section 79 to side sections 81 and 83. Support truss 87 is enclosed within shroud 78. Flight vehicle 77 includes pitch axis actuator 89, bellcrank 91, and rod 93. Truss 87 is connected to rod 93 at a first hard point 95. A hard point, such as the first hard point 95, is a structural element for transmitting an applied force to an underlying support structure capable of opposing the applied force. Truss 87 transmits the force from pitch axis actuator 89 to engine 65.

Pitch axis actuator 89 imparts a force sufficient to rotate rocket engine 65 and attached nacelle 67 about a pitch axis passing through gimbal 75. Flight vehicle 77 also includes a second actuator, bellcrank and rod, for rotating engine 65 about a yaw axis passing through gimbal 75. The pitch and yaw axes are orthogonal. Consonantly, nacelle 67 includes a second hard point (designated by the numeral 97 in FIG. 4) for connecting truss 87 to the yaw axis actuator. The foregoing parts for yaw axis rotation are not shown in this drawing, but are well-known to those of ordinary skill in this art. Together, the two actuators can vector the thrust of rocket engine 65 about the pitch and yaw axes.

Shroud 78 is attached to rocket engine 65 by being attached to truss 87 at the first hard point 95 and at the aforementioned second hard point (designated by the numeral 97 in FIG. 4); by being fastened to nozzle 71 around the circumference of exhaust orifice 73; and by being fastened to engine 65 adjacent to the gimbal 75.

FIG. 4 is a top view of shroud 78 of nacelle 67. Shown therein is the first hard point 95, as well as the second hard point 97 for connection to the yaw axis actuator. Openings 99 and 101 provide for the passage of propellant lines 68 from the flight vehicle 77 to the rocket engine 65. This drawing more clearly shows side sections 81 and 83 of the shroud 78. Also shown in FIG. 4 is a field joint 103, which joins the side sections 81 and 83, and a circumferential field joint 85, which joins the side sections 81 and 83 to the top section 79.

FIG. 5 is a side view of the nacelle 67. The truss 87 is shown by hidden lines, and it can be discerned that the truss 87 is connected to the shroud 78 at first and second hard points 95 and 97. The field joints 85 and 103 are also clearly shown in FIG. 5.

FIG. 6 is a cross-sectional view of the field joint 103 taken along line 6—6 of FIG. 5. The side sections 81 and 83 overlap and form recess 105 along the joint 103. Hole 107 in side section 83, hole 109 in side section 81, and threaded hole 111 in nut plate 113 are aligned. Threaded bolt 115 is inserted through the holes 107 and 109, and threadably engaged with the threaded hole 111. The side sections 81 and 83 are thereby fastened together. The field joint 103 includes such fastening parts at a plurality of locations along its length. Plug 117 is inserted into the recess 105. The plug 117 is composed of a material which provides thermal insulation, such as an alumina enhanced thermal barrier material or a room temperature cured silicone rubber.

Figure 7:
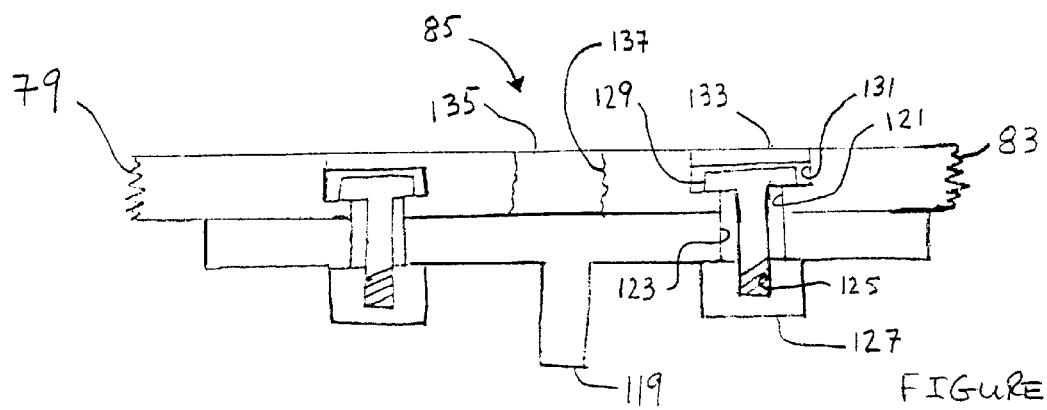
FIG. 7 is a cross-sectional side view of the circumferential field joint used to attach the top section of the shroud to the two side sections.

FIG. 7 is a cross-sectional view of the circumferential field joint 85 taken along line 7—7 of FIG. 5. Circumferential mating ring 119 overlaps the respective edges of both the top section 79 and the side section 83. Hole 121 in the side section 83, hole 123 in the mating ring 119, and threaded hole 125 in nut plate 127 are aligned. Threaded bolt 129 is inserted through the holes 121 and 123, and threadably engaged with the threaded hole 125. Such fastening parts are simularly used to fasten the adjacent part of the top section 79 to the mating ring 119.

The circumferential field joint 85 includes a plurality of such fastening elements at stations about the circumference of the shroud 78. The threaded bolt 129 is countersunk in recess 131 in the side section 83. Insulating plug 133 is inserted into the recess 131. Insulating plug 135 is inserted into gap 137 between edges of the top section 79 and the side section 83.

Figure 8:
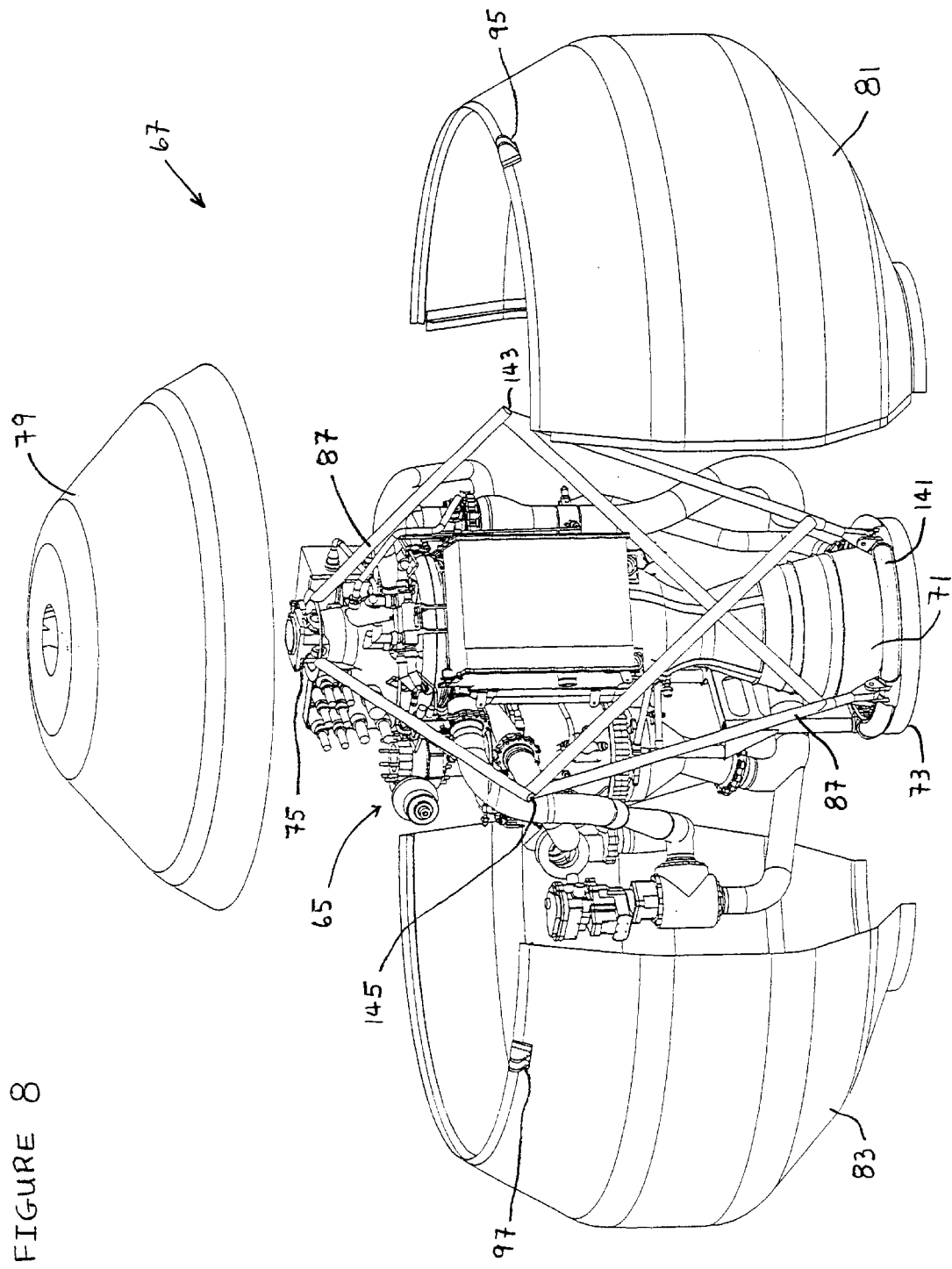
FIG. 8 is an exploded view of the nacelle and a perspective view of the enclosed rocket engine.

FIG. 8 depicts the top section 79 and the side sections 81 and 83 exploded around the rocket engine 65. The rocket engine 65 includes nozzle ring 141. The truss 87 is attached to the rocket engine 65 by being fastened to the nozzle ring 141. Intersections 143 and 145 of the truss 87 are respectively attached to the first and second hard points 95 and 97 of the shroud 78. The side sections 81 and 83 are attached to the nozzle 71 around the circumference of the exhaust orifice 73.

Figure 9:
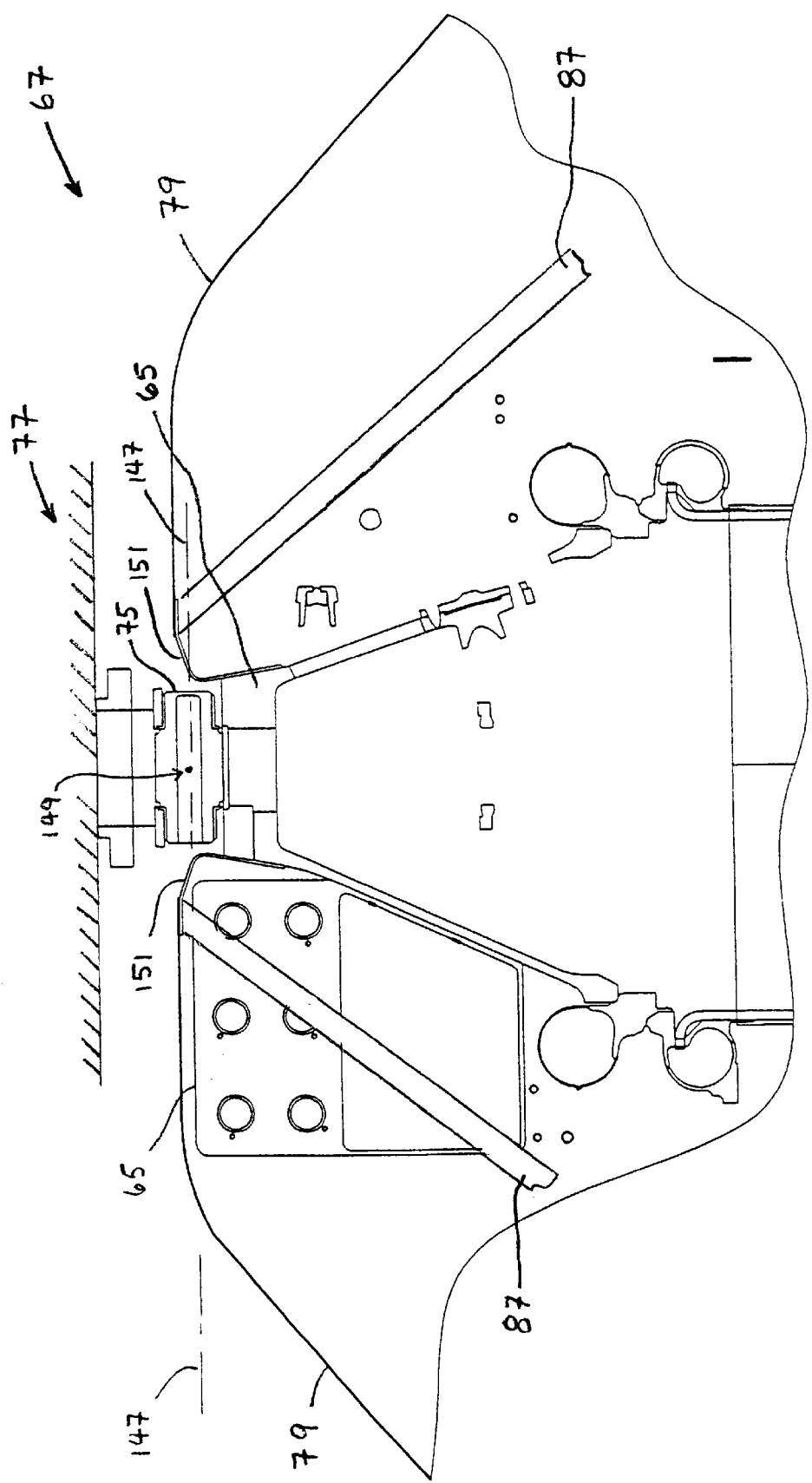
FIG. 9 is a side view of part of the nacelle, particularly showing the gimbal rotatably attaching the rocket engine to the flight vehicle, and an attachment cone for attaching the shroud and the truss to the engine.

FIG. 9 depicts a side view of the gimbal 75 and the adjacent structure of the rocket engine 65 and the nacelle 67. The gimbal 75 rotatably attaches the rocket engine 65 to the flight vehicle 77. More particularly, the gimbal 75 is fixedly attached to the flight vehicle 77. The rocket engine 65 is rotatably attached to the gimbal 75 such that the engine 65 is free to rotate about yaw axis 147 and pitch axis 149, respectively.

The rocket engine 65 includes attachment cone 151. The truss 87 is fastened to the attachment cone 151. The top section 79 of the shroud 78 is also fastened to the attachment cone 151. The respective connections of the pitch actuator 89 and the yaw actuator to the truss 87, together with the aforementioned attachments of the shroud 78 to the rocket engine 65, transmits most of the forces from the actuators through the truss 87 to the rocket engine 65. Very little of the actuator forces are transmitted through the shroud 78.

The shroud 78 is preferably made from either inconel alloy or from a high temperature rigid ceramic such as carbon-carbon, in order to retain its structural rigidity in a high temperature environment.

Although a presently preferred embodiment of the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

What is claimed is:

1. A nacelle for protecting a rocket engine which is rotatably attached to a flight vehicle, the nacelle comprising:
   a shroud enclosing the rocket engine; and,
   attachment means for attaching said shroud to the rocket engine for rotatable movement with the rocket engine relative to the flight vehicle.

2. The nacelle as set forth in claim 1, wherein the flight vehicle includes an actuator for rotating the rocket engine and said shroud relative to the flight vehicle.

3. The nacelle as set forth in claim 2, further comprising transmission means for transmitting rotational forces generated by the actuator to the rocket engine.

4. The nacelle as set forth in claim 3, wherein said transmission means is enclosed by said shroud.

5. The nacelle as set forth in claim 4, wherein said transmission means comprises a truss.

6. The nacelle as set forth in claim 3, wherein said transmission means comprises a truss.

7. The nacelle as set forth in claim 5, wherein said shroud and the actuator are both attached to said truss at a hard point.

8. The nacelle as set forth in claim 1, wherein said shroud is comprised of a plurality of sections attached to one another.

9. The nacelle as set forth in claim 8, wherein said plurality of sections include a top section, a first side section, and a second side section.

10. The nacelle as set forth in claim 9, further comprising field joints for attaching said plurality of sections together.

11. The nacelle as set forth in claim 10, wherein said field joints include:
    a longitudinal field joint for attaching said first side section to said second side section; and,
    a circumferential field joint for attaching said top section to said first and second side sections.

12. The nacelle as set forth in claim 1, wherein said attachment means includes fastener means for fastening said shroud directly to the rocket engine.

13. The nacelle as set forth in claim 1, further comprising a gimbal for rotatably attaching the rocket engine to the flight vehicle to allow rotation of the rocket engine and said shroud attached thereto relative to the flight vehicle.

14. The nacelle as set forth in claim 13, wherein the gimbal allows rotation of the rocket engine and said shroud attached thereto about both a pitch axis and a yaw axis.

15. The nacelle as set forth in claim 1, wherein the flight vehicle includes:
    a pitch actuator for rotating the rocket engine and said shroud relative to the flight vehicle about a pitch axis; and,
    a yaw actuator for rotating the rocket engine and said shroud relative to the flight vehicle about a yaw axis.

16. The nacelle as set forth in claim 15, further comprising transmission means for transmitting yaw and pitch forces generated by the yaw and pitch actuators, respectively, to the rocket engine.

17. The nacelle as set forth in claim 16, wherein said transmission means is enclosed by said shroud.

18. The nacelle as set forth in claim 17, wherein said transmission means comprises a truss.

19. The nacelle as set forth in claim 18, wherein:
    the pitch actuator is attached to said truss at a first hard point; and,
    the yaw actuator is attached to said truss at a second hard point.

20. A nacelle for protecting a rocket engine which is rotatably attached to a flight vehicle, the nacelle comprising:
    a shroud enclosing the rocket engine; and,
    attachment facilities for attaching said shroud to the rocket engine for rotatable movement with the rocket engine relative to the flight vehicle.

21. A nacelle for protecting a rocket engine which is rotatably attached to a flight vehicle to permit two axis rotation of the rocket engine with respect to the flight vehicle, the nacelle comprising:
    a shroud enclosing the rocket engine; and
    means for attaching the shroud to the rocket engine for rotatable movement with the rocket engine relative to the flight vehicle.

22. The nacelle as set forth in claim 21, wherein the nacelle is rotated by an actuator disposed within the flight vehicle.

23. The nacelle as set forth in claim 21, wherein the attachment means includes means for fastening the shroud directly to the rocket engine.

24. The nacelle as set forth in claim 21, further comprising gimbal means for rotatably attaching the rocket engine to the flight vehicle to thereby allow two axis rotation of the rocket engine and the shroud attached thereto with respect to the flight vehicle.

* * * * *